Dec. 18, 1962   F. WERNER   3,068,741
OBJECTIVE READING OF SCALES
Filed March 18, 1958   2 Sheets-Sheet 1

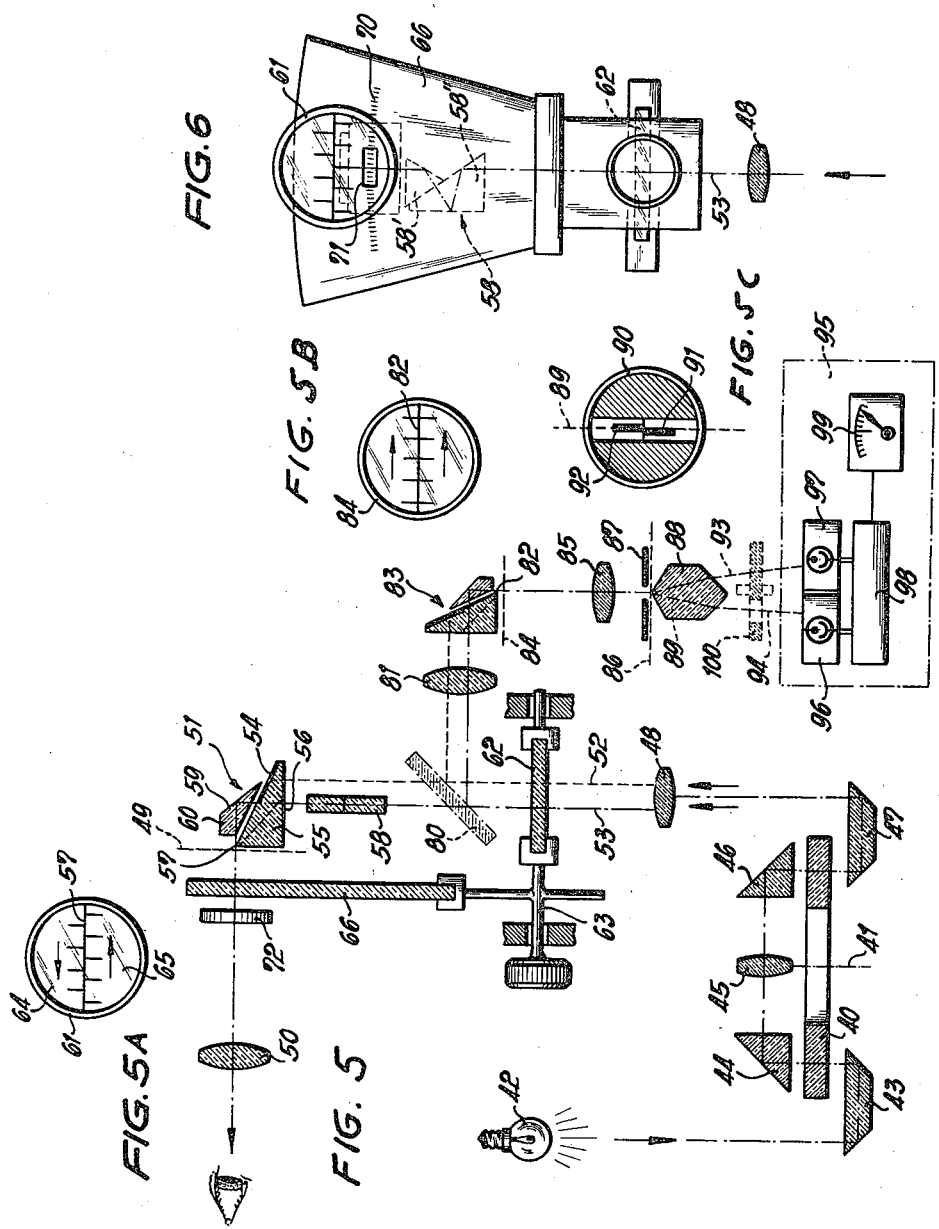

United States Patent Office 3,068,741
Patented Dec. 18, 1962

3,068,741
OBJECTIVE READING OF SCALES
Friedrich Werner, Berlin-Grunewald, Germany, assignor to Askania-Werke A.G., Berlin-Friedenau, Germany, a corporation of Germany
Filed Mar. 18, 1958, Ser. No. 722,320
Claims priority, application Germany Mar. 22, 1957
12 Claims. (Cl. 88—14)

This invention relates to a new method of any means for the objective reading of scales such as divided circles.

A variety of attempts have been made to eliminate those reading errors which are cause by subjective limitations of human observers and by fatigue, particularly when large numbers of accurate readings are required. However, the accuracy thus far obtained by objective or automatic reading means and methods, particularly in the microscopic reading of scale dividing marks, has been limited, which was due in some systems to vibrations of rapidly moving parts, variations of illumination of marks, difficulties of interpolation between widely separated marks, and/or other influences. Nevertheless the automatic reading of scales was thus far complex and expensive; the arrangements were cumbersome; and other shortcomings were involved.

It is an object of this invention to provide for the objective reading of scales with higher accuracy than has hitherto been obtained. Another object is to avoid undue expense, complexity and difficulty. Specific objects are, to eliminate trouble caused by varying illumination of the scale; to make the arrangement adaptable to the reading of any desired type of scale, used in any type of machine; and to make it readily portable, easy to manipulate and inexpensive to provide.

The way in which these and other objects have been achieved may be briefly characterized by saying that a plurality of rays, for instance a pair of rays, are derived from the mark to be read, the radiant fluxes of which are compared, that such comparison is used—for instance by differential photometry—for determining the position of the mark objectively, and that ray shifting and shift indicating means are provided in novel combination with the means for flux comparison. Details will be understood upon a study of the following description of preferred embodiments of the new apparatus.

Figure 1:
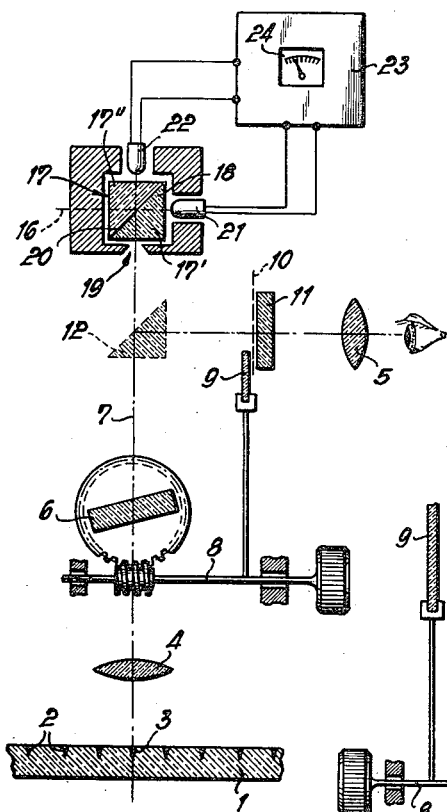
Figure 2:
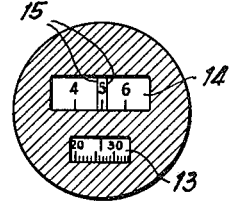
Figure 4:
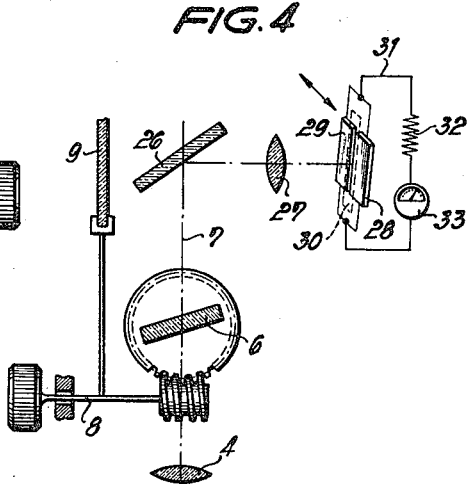
Figure 3:
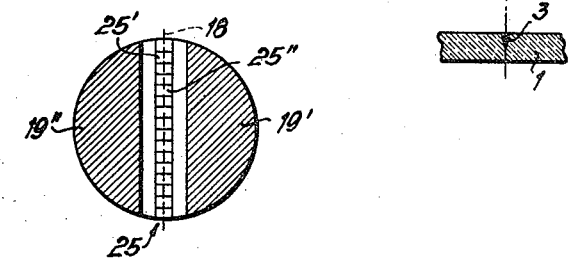

In the drawing, FIGURE 1 is a schematic, sectional elevation of a first embodiment of such apparatus. FIGURES 2 and 3 are schematic views of images formed at certain points of this apparatus. FIGURE 4 is a fragmentary view generally similar to FIGURE 1 but showing a second embodiment. FIGURE 5 is a view generally similar to FIGURE 1 but showing a third embodiment. FIGURES 5A, 5B and 5C are views generally similar to FIGURES 2 and 3 but showing images formed in the apparatus of FIGURE 5. FIGURE 6 is a fragmentary sideview of the said apparatus of FIGURE 5, with housing elements added.

In FIGURE 1 there is shown a scale 1 with dividing marks 2, 3 thereon, which marks may be radiant or phosphorescent or may be imaged by making them opaque on a transparent background or vice versa. They may for instance consist of fine and accurate etch marks in glass, which may be suitably blackened; and the scale may then be illuminated for instance from the back thereof, that is, in the drawing from below. For interpolating readings between adjacent marks there is shown an optical micrometer, known by itself and cooperating with an imaging system 4 and a reading microscope ocular 5. The micrometer comprises a plane parallel plate of glass 6 tiltable relative to the optical axis 7 by a micrometer system 8 which as shown may comprise a worm and worm gear drive, subject, of course to various changes. System 8 also rotates a glass plate 9 having a surface substantially in the image plane 10 of system 4, said plane coinciding with the object plane of ocular 5 and being substantially shared also by a surface of transparent index plate 11 of the microscope. Optical means such as reflector prism 12 divert the rays on the axis 7 into system 11, 5. Plate 9 is disposed a short distance below the horizontal portion of axis 7. Thus there is formed a composite image in the microscope as shown in FIGURE 2. Suitable aperture means, not shown, provide a window 13 wherein the observer may read a scale provided by plate 9, while window 14 shows a section of scale 1. For the purpose of interpolation between two division marks, micrometer drive 8 is turned until plate 6 sufficiently shifts the ray trace 7 of one mark, for instance mark 3 to cause it to coincide with the reading index on plate 11. As shown in FIGURE 2, a double mark 15 may serve as index and the mark 3—shown with legend "5"—may be centered therewith. The actual distance of mark 3 from index 15 can be read at 13.

According to the invention means are provided for objective supervision of the coincidence of division images with index 15, in order to eliminate reading errors, which otherwise may occur, from the reading of the scale. For this purpose the reflector prism 12 can either be removed from the position in which it is shown in FIGURE 1, or it can be provided in form of a partial reflection means or particularly a spectrally selective reflecting and transmitting element or so-called interference mirror. In the latter case, the rays passing through the partial reflection means and which are suitably controlled at 4, converge in plane 16, where they form a real image of marks 2, 3 on scale 1; and said image is divided into a pair of partial images by image splitter 17. This image splitter consists of two prisms 17', 17" having one surface in common, one half of said surface being mirrored, up to an edge 18, by a mirror layer 20 on one of the two prisms, and the image being divided by edge 18. Two separate bundles of rays proceed from the so divided image, one being reflected by layer 20 to a photocell 21 and the other being transmitted by the unmirrored portions of the prisms to a second photocell 22. The cells may constitute photoelectric or photovoltaic elements or the like and may furnish voltages or currents which can be compared with one another in a suitable differential photometer 23 having an indicator 24. The mark 3 is objectively centered on edge 18—and on index 15—when indicator 24 shows a zero differential of light flux between the ray bundles reaching cells 21, 22.

FIGURE 3 shows the image plane 16 with the mirror edge 18 centrally and diametrically disposed therein. Segments 19', 19" are dark areas, formed by a slot aperture 19 in a housing surrounding image splitter 17, and the image of the slot aperture is a stationary, illuminated strip, with stationary edge 18 centered therein. The image of the division mark 3 appears as a narrower strip 25, which is divided into a pair of still narrower strips 25', 25" by edge 18. The photocells 21, 22 compare the luminosities of the two halves of the illuminated strip, which are equal when image 25 is centered on edge 18.

The photometric comparison can be performed by a variety of cells and the like but it has been found that present purposes are served particularly well by monocrystalline semiconductor devices such as photo diodes or photo transistors of germanium, silicon or binary units of indium-antimony, gallium-arsenic and the like. Both cells 21, 22 are disposed in a housing of high thermal conductivity, for instance in a metallic shell, which may also provide the slot 19. They are thus kept at uniform temperatures, thereby avoiding changes of sensitivity which could affect the measurements. The stability of the entire device is excellent when this arrangement is used and particularly when the cells are used as elements, that is, without external voltage impressed thereon.

In the modified embodiment of FIGURE 4 the image of the dividing mark 3, formed by system 4 and reflected at 26 is magnified at 27 and then brought onto a system of blocking layer photocells 28, 29 forming a differential circuit, so that, if the image 30 of the mark is symmetrical with the system 28, 29, the voltages of the two cells cancel one another. On a lateral shift of the image a differential voltage is created by said system, whereby a current is caused to flow through a measuring circuit 31, containing a resistor 32 and a suitable measuring instrument 33 for indicating any asymmetry of the position of the mark. This arrangement allows electrical interpolation as well as supervision of the coincidence of mark and index, both by device 33.

Still another embodiment is shown in FIGURE 5, wherein numeral 40 designates one of the circles, for instance the horizontal circle, of a theodolite, rotatable about the vertical instrument axis 41. The invention is here used for reading circle portions angularly spaced by 180 degrees, according to a coincidence method. For this purpose light is directed onto the circle from source 42 via prism 43 for homogeneous illumination of one of the circle positions to be read. An image of said position is brought via prism 44, imaging system 45, reflecting prism 46 to the other position to be read, so that the images of marks on both positions, when coinciding, lie on different portions of a straight line. Such images are brought via prism 47 and imaging system 48 into a plane 49, forming the object plane of ocular 50; and a prism system 51 serves to compare the positions of the images with that of a fixed edge. The centerlines of the ray bundles carrying the images of the two marks are shown at 52 and 53. The ray 52 is reflected by mirrored surface area 54 on prism 55 of system 51, and again by surface 56, whereupon it is refracted as it leaves prism 55 below the edge 57 which serves as image splitting edge, and is sharply imaged in plane 49. The other ray 53 passes a reversing system 58, then passes prism 55 and is reflected at surface 59 of a second prism 60 forming part of system 51. It is sharply imaged in plane 49, above edge 57.

FIGURE 5A shows the image field 61 of ocular 50, wherein the edge 57 is visible as a central, diametrical line, separating the first portion 64 of scale 40 from the second portion 65 thereof. The optical micrometer means or plane parallel plate 62, rotatable about axis 63, causes parallel displacement of rays 52, 53, thereby displacing portions 64, 65 in field 61; and as ray 53 passes through reversing system 58, the movements of images 64, 65 are antiparallel. Said movements, produced by rotation of plate 62, are used to cause coincidence of the marks in field 61, and the tilting of axis 63, required for this purpose, is read on plate 66, which carries a division 70 (FIGURE 6), visible in a window 71 of ocular system 50. This window is provided for instance by a diaphragm member 72 (FIGURE 5). The side reversal at 58 is provided by well-known prisms 58', 58" (FIGURE 6).

According to the invention, the optical system again includes a reflector or partial reflector, here shown at 80, for reflecting rays 52, 53 into an objective coincidence determining system via magnifier 81, prism system 83 with image splitting edge 82 corresponding to edge 57, image plane 84, imaging and magnifying system 85, new image plane 86 behind slot aperture member 87, and final image splitter 88, having an edge 89 (shown rotated in the schematic drawing for simplicity of illustration) at right angles to the edge 82. FIGURE 5B shows the image in plane 84, which resembles that in plane 49 except that the parts thereof move in parallel, not antiparallel directions; and FIGURE 5C shows the image 90 in plane 86, which comprises two highly magnified marks 91, 92 from the two parts 64, 65 of circle 40. Edge 89 splits the two marks lengthwise and the corresponding light fluxes of ray bundles 93, 94 reach a comparing system 95 for comparing their strength. In this latter system 96 and 97 are light sensitive elements, 98 is an amplifier and 99 is an indicator. It is believed that details of system 95 are of secondary nature; it may operate with direct currents or—for instance when using a light chopper 100—with alternating currents.

It is further believed to be obvious from a study hereof that various other modifications are possible. For instance, the reading means 50, 51 etc. can be replaced by relatively coarse indicators; the marks 2, 3 may not only be luminescent or transparent or opaque but may for instance have forms other than the form of straight lines as illustrated, such as forms of circles or arcs or the like; and many other changes can be made.

I claim:

1. An instrument for precisely reading graduations of a scale, comprising: means for forming an image of a graduation and a light-contrasting background in an image plane; means for splitting said image into a pair of image portions in said plane; photoelectric means for indicating differential luminances of such portions; an optical shifting element movably interposed between said scale and said image plane for setting, by motion of the element with the scale in any given fixed position, the graduation image produced in said plane along the line of splitting of the image; means for effecting said motion of the image shifting element; and calibrated means for indicating such set position of the image shifting element.

2. An instrument as described in claim 1 including means for visually observing the graduation image and the calibrated indicating means in a common field of view.

3. An instrument for reading and interpolating a scale comprising a magnifying optical system adapted for viewing of a scale, such optical system having an objective portion and a viewing field, and illuminating means cooperating therewith to produce an image of a scale marker against a light-contrasting background, a manually settable image shifter in the optical path between the scale and the viewing field adapted to shift the portion of the scale imaged in the optical system, in any given position of the scale, differential photometric means to produce an indication of any difference in illumination on opposite sides of the optical path, and calibrated position-indicating means mechanically connected to the shifter to indicate its set position, so that the image of a calibration marking may be centered in the optical path by nulling of the difference-indicating means in adjustment of the shifter, and the calibration marking then appears in standard position in the viewing field, the set position of the shifter being indicative of the distance of the marking from a centered position with respect to the optical axis of the objective portion.

4. The device of claim 3 wherein the difference-indicating means comprises an optical image-splitter in an image plane, and photosensitive means to compare the illumination of the portions of the split image.

5. An instrument for reading and interpolating a scale comprising an optical system adapted to produce a visible image of a calibrating marker of the scale in a standard position in a viewing field when the calibrating marking is in a standard relation to the optical axis, an optical shifter in the optical system adapted to shift the visible image of a calibrating marker of the scale with respect to the optical axis of the system, photosensitive means to indicate the presence of the image of a marker in the standard relation to the optical axis, means to move the shifter to set the marker in such standard relation, and a calibrated indicator mechanically coupled to the moving means and in the viewing field of the optical system, whereby the marker under observation may be placed in standard position in the viewing field in accordance with the photosensitive indication, and the indication of the marker and the position of the marker with respect to the optical system may thereupon be read in the field of view.

6. The device of claim 5 having interposed between the shifter and the viewing field means for splitting the image into two portions along the direction of shift and means for reversing the direction of shift of one of the portions of the image.

7. An instrument for reading and interpolating a scale comprising an image-forming optical assembly including an objective adapted to be placed adjacent to a portion of the scale, and means including an optical branching element dividing the objective rays into two branching portions for forming images of such portions of the scale on a light-contrasting background in two separate image planes, an optical image shifter between the scale and the ray-divider, an ocular viewing one image plane, differential photometric means for comparing the illumination opposite portions of the other image plane, and calibrated means for indicating the position of the image shifter, whereby the shifter may be adjusted to null the photometric means by centering a scale marker image in its image plane and the scale marker then appears in standard position in the ocular, the position of the shifter in the condition serving to interpolate between adjacent scale markers.

8. An instrument for reading and interpolating a circular scale having equally spaced markers comprising an objective, means for producing in the field of the objective light-contrast images of scale makers on the scale, said marker images being in substantially standard relation, an optical branching element dividing the objective rays into two branches, means in one branch normally responsive to motion of the markers away from a centered position in the field to produce images of the respective markers moving in opposite directions from the standard relation, means in the other branch normally responsive to motion of the markers away from a centered position to produce images of the respective markers moving in the same direction and in such substantially standard relation, an optical shifter in the portion common to both branches, an eyepiece viewing the image plane of the first branch, differential photometric means in the image plane of the second branch, and a calibrated indicator of the position of the shifter, whereby operation of the shifter simultaneously restores the relation of the markers in the eyepiece and the balance of the photometric means, and the scale may be interpolated by the position of the shifter in which these restored conditions are obtained.

9. An instrument for reading and interpolating a scale having substantially equally spaced markers comprising an objective, means for showing in the field of the objective two different markers of the scale in substantial alignment, such markers moving across their respective portions of the field in the same direction with motion of the scale, and means for forming a composite image of said two portions of the field of the objective in a common image plane, the image-forming means producing the same alignment condition as exists in the field of the objective when the two markers are on the optical axis of the image-forming means but producing opposite motion of the images in respective portions of the composite field in response to deviation from the optical axis, calibrated means common to both portions of the field operable to shift a non-axial composite image to the optical axis, and photoelectric means responsive to the position of the substantially aligned markers in the field of the object to indicate exact positioning of said two markers on the optical axis, whereby the scale may be interpolated by operation of the shifting means to align the respective marker images in the composite image, and the interpolation made exact by use of the auxiliary detection means.

10. An instrument for reading and interpolating a scale having substantially equally spaced markers comprising an ocular adapted for the viewing of an image plane, optical means for producing in the image plane a composite image of markers on different portions of the scale, the images of markers of one portion being in predetermined relation to the images of markers of the other portion in the composite image in successive positions of the scale corresponding to the marker spacing and the two portions of the composite image so formed moving in opposite directions in the image plane in response to motion of the scale in either direction from said positions, the optical means including a calibrated image shifter in the optical path of at least one of the image portions operable to move such portion to restore the predetermined relation, means for forming an auxiliary image shifted by the shifter entirely in one direction, and photoelectric detection means for detecting the position of the auxiliary image whereby the shifter may be operated to produce the standard relation of the markers as seen in the eyepiece and thus interpolate between positions of the scale corresponding to markers and the interpolation may be made exact by use of the auxiliary detection means.

11. An instrument for reading and interpolating a scale having substantially equally spaced markers comprising optical means for producing in a single image plane images of markers on different portions of the scale, the markers of the respective portions of the scale being imaged in a standard relation in each position of the scale corresponding to a marker interval, and moving in opposite directions in the image plane in response to motion of the scale from such position, and calibrated image-shifting means in the optical path of a least one of said images operable to shift such image to restore the standard relation of the images in the image plane, the position of the image-shifting means thus serving to interpolate between marker intervals, means for forming on auxiliary image shifted by the shifter entirely in one direction, and photoelectric detection means for detecting the position of the auxiliary image.

12. An instrument for reading and interpolating a scale having substantially equally spaced markers comprising optical means for producing composite image of markers on different portions of the scale, the markers of the respective portions of the scale being imaged in a standard relation in positions of the scale corresponding to a marker interval and moving in opposite directions in the image plane in response to motion of the scale from such positions, the optical means including calibrated image-shifting means operable to shift the optical paths of the marker images in the same direction to simulate motion of the scale for production of the standard relation in interpolation between such scale positions, optical means for producing a second composite image of such markers as shifted by the shifting means, the markers moving in the same direction in the second composite image in response to motion of the scale and to adjustment of the shifting means, and photoelectric means for detecting the position of the second composite image of the markers.

References Cited in the file of this patent

UNITED STATES PATENTS

| | | |
|---|---|---|
| 2,363,877 | Larsen et al. | Nov. 28, 1944 |
| 2,392,979 | Douden | Jan. 15, 1946 |
| 2,583,973 | Stamm et al. | Jan. 29, 1952 |
| 2,612,814 | Glasser | Oct. 7, 1952 |
| 2,757,567 | Hillman et al. | Aug. 7, 1956 |
| 2,795,992 | Tao | Jan. 18, 1957 |
| 2,852,976 | Hoffman | Sept. 23, 1958 |
| 2,891,239 | Parsons | June 16, 1959 |

FOREIGN PATENTS

| | | |
|---|---|---|
| 583,988 | Germany | Sept. 13, 1933 |
| 684,435 | Great Britain | Dec. 17, 1952 |